3,103,248
METHOD OF PLUGGING A FORMATION WITH
BETA-LACTONES
Leo J. O'Brien, Crystal Lake, Ill., assignor to The Pure Oil Company, Chicago, Ill., a corporation of Ohio
No Drawing. Filed May 4, 1961, Ser. No. 107,647
10 Claims. (Cl. 166—33)

This invention relates to the selective plugging of subterranean formations traversed by a well-bore, and in particular it concerns improved methods for selectively plugging subterranean formations which may contain various fluids such as natural gas, oil, or water.

In many petroleum-producing areas the crude oil produced is mixed with various quantities of gas, brine, or water. Well effluents comprising as much as 90% water or brine and only 10% petroleum are common. The presence of large quantities of gas, brine, or water frequently adds appreciably to the cost of producing petroleum from such wells. In other instances, variations in formation permeability hamper drilling operations and render ineffective secondary-recovery water-flood techniques.

The present invention is particularly directed to a method and composition for decreasing the permeability of loose or unconsolidated zones in a subterranean formation adjacent to a well-bore. It is therefore a primary object of this invention to provide a convenient, reliable method for plugging a formation zone of undesirably high permeability. It is another object of this invention to provide a technique for plugging zones which are devoid of a material capable of catalyzing or reacting with an injected plugging agent to cause the plugging agent to set. Still another object of this invention is to provide a technique for plugging formation zones which may contain natural gas, water or brine.

The method of this invention comprises injecting into a subterranean formation to be plugged an anhydrous solution of a beta-lactone in a suitable solvent. Beta-lactones are self-polymerizing at temperatures normally encountered in subterranean formations, that is, at temperatures in the range of about 70° F. to about 200° F. The rate of polymerization varies with temperature and with the concentration of beta-lactone in the solvent carrier. The polymerization is catalyzed by the presence of water, and the efficiency of the catalysis is enhanced if the water is acidic or basic, or contains dissolved salts.

The beta-lactones which are useful in carrying out the present invention have the reactive nucleus

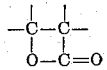

the free valences being satisfied by hydrogen or hydrocarbonyl radicals, such as alkyl, cycloalkyl, aryl, or alkaryl radicals. The beta-lactones having only hydrogen, or hydrogen and alkyl substituent are preferred, and it is further preferred that each alkyl substituent have fewer than about 10 carbon atoms. An especially preferred compound is beta-propiolactone. Other suitable beta-lactones include:

β-Butyrolactone (β-methyl-propiolactone)
β-Methyl-β-butyrolactone (β,β-dimethyl-propiolactone)
β-Ethyl-β-butyrolactone
β-Phenyl-β-propiolactone While throughout the following specification the invention will be described in detail in terms of the use of beta-propiolactone, the preferred compound, it will be understood that the named beta-lactones and other hydrogen and/or hydrocarbon-substituted beta-lactones, as set forth above, can be employed under the same conditions to achieve substantially the same results.

Numerous solvents may be employed as a carrier fluid for injecting the beta-propiolactone into the subterranean formation. Suitable solvents include hydrocarbons, especially the lower aliphatic, naphthenic, and aromatic materials of low viscosity. Suitable specific solvents include hexane, benzene, and toluene. Especially preferred are lower-boiling petroleum fractions such as kerosine, gas oil, and gasoline-boiling-range fractions. Other suitable solvents include the lower aliphatic alcohols, aldehydes, and ketones. In some instances it will be preferred, as hereinafter pointed out, to employ lower alcohols, aldehydes, or ketones having a predetermined solubility in water. For example, ethyl and methyl alcohols are highly soluble in water, propyl and butyl alcohols have substantial solubility in water, and amyl and hexyl alcohols possess only moderate water solubility. Similarly, dimethyl ketone is highly soluble in water, as is acetaldehyde. Methyl ethyl ketone and ethyl butyl ketone are of moderate solubility, but higher ketones are only slightly soluble in water. All of the foregoing enumerated alcohols, aldehydes, and ketones may be employed, and are merely exemplary of numerous other anhydrous solvents which may be used as a carrier or vehicle for the beta-propiolactone, which will be incorporated in the amount of about 10 to 50% by weight in the solvent.

Where the formation to be treated contains only gas or hydrocarbon material, any of the above-enumerated solvents may be employed, the petroleum fractions being preferred because of their low cost. The beta-propiolactone is incorporated in the solvent in the amount of 10 to 50% by weight, the exact amount incorporated being determined by the temperature of the formation which is to be treated, where the formation temperature is known. Pure beta-propiolactone polymerizes slowly at room temperature, and at increasing rates at higher temperatures. Where the formation temperature is low, say not above 150° F., and the zone to be treated is free of water, the quantity of beta-propiolactone incorporated in solvent should be not less than 25% by weight, and preferably should approach 50% by weight. While more dilute solutions may be used, the results may not be altogether satisfactory, and the time required for the beta-propiolactone to polymerize and set may be excessive. At higher formation temperatures approaching 200° F., the beta-propiolactone polymerizes at a suitable speed when lower concentrations are employed.

It has been stated that the presence of water catalyzes the polymerization of beta-propiolactone. The efficiency of the catalysis is enhanced when the water is not neutral, that is, has a pH of less than 6 or more than 8. The presence of dissolved salts in excess of about 0.2% by weight in the water also materially increases the efficiency of the catalysis. These considerations should be borne in mind when treating formations which contain large quantities of water. It is preferred in such instances, where the formation temperature is not high, to take advantage of the catalytic effect of the water in speeding the polymerization of the injected material. This can be best accomplished by incorporating the beta-propiolactone in a water-soluble solvent. For example, in treating a formation containing fresh water, wherein the formation temperature is about 100° F., a solvent having a high affinity for water (such as ethyl alcohol) can be employed. Polymerization upon injection will be very rapid where concentrations of beta-propiolactone as low as about 15% by weight are incorporated in the solvent. If it is desired to slow the rate of polymerization to permit the injection of plugging material to a greater lateral distance into the formation, a solvent which is only moderately soluble in the formation water, such as amyl alcohol, should be used. When a water-soluble solvent is employed, the concentration of beta-propiolactone should not exceed about 30% by weight.

Where the formation temperature is high, say 180° F., and the formation contains water which is acidic, basic, or has appreciable salt content, a hydrocarbon solvent should be employed, since such solvents are substantially insoluble in the formation water, and thus retard too rapid a polymerization of the beta-propiolactone, which might otherwise prevent adequate penetration of the injected plugging solution before polymerization occurs. Where the formation temperatures are lower, say 110° F., it is preferred to incorporate the beta propiolactone in a solvent having some solubility in water, such as dibutyl ketone, so that lower concentrations of beta-propiolactone may be employed and still obtain a suitable polymerization rate.

It should be remembered, however, that the quantity of beta-propiolactone incorporated in the injected vehicle determines not only the rate of the polymerization reaction, or setting time but also influences the final permeability of the formation after treatment. Thus, a given formation may be treated with a 35% solution of beta-propiolactone in kerosine, or a 10% solution of beta-propiolactone in butyl alcohol, both solutions (under specified conditions) having about the same setting time. However, the final formation permeability will be considerably lower where the first-described treating fluid is employed.

Thus the conditions influencing the setting time of the injected solution include the concentration of beta-propiolactone in the solvent, the formation temperature, the presence or absence of water in the formation, the salt content and pH of the water, and the solubility in water of the carrier solvent when water is present in the formation. Various techniques may be employed for introducing the afore-described plugging compositions into subterranean formations penetrated by a well-bore. In general, the procedure comprises filling the cased bore-hole with a suitable non-aqueous fluid, such as crude oil, and introducing a charge of plugging composition at the desired level through a well tubing-string while displacing the crude oil or other fluid from the bore at the top of the well casing. The displacement of crude oil may then be terminated and the injection of plugging fluid continued to cause penetration into the selected formation zone. The quantity of plugging composition employed depends upon the length and porosity of the formation being treated and the desired depth of penetration of the composition in the formation, and can readily be calculated by those skilled in the art. After introduction of the required quantity of plugging composition into the formation, the well is allowed to stand under pressure for a period of time sufficient for the beta-propiolactone to polymerize. Such time will be determined by the various conditions as aforedescribed. The well-bore is then pumped out and the well is allowed to produce in the normal manner.

Various modifications of the foregoing general method may be employed. Thus the treatment may be applied to the formation by the use of packers set between the tubing string and the well casing, above and below the zone selected for treatment. The treatment may be repeated one or more times, i.e., after the initial treatment the well may be placed in production for a short period of time to wash out the plugging liquid composition, and thereafter given a second or even a third treatment with the same or a different plugging composition. Also, the plugging composition may be introduced in the formation in two or more increments without intervening production periods, and the increments may have the same or different composition. Other variations are well within the knowledge of the art, and in general any of the conventional methods for injecting liquids into a subterranean formation may be employed in carrying out the present process. The invention resides in the use of the particular plugging composition aforedescribed and defined in the appended claims.

The method of this invention is illustrated by the following specific examples.

*Example I*

A spinner test run in an injection well, during a waterflooding project, shows that a thief zone exists at the interval from 1283 to 1290 feet. In accordance with this invention, water injection is interrupted, the well is bailed, packers are set at 1280 feet and 1295 feet, and 50 gallons of a 25% solution of beta-propiolactone in acetone are injected into the formation between the packers. The temperature of the formation treated, because of previous water injection, is 70° F. Pressure is maintained on the isolated zone for 24 hours. The packers are then removed and water injection is resumed. A spinner test one week later shows that the interval from 1283 to 1290 feet is accepting water at about the same rate as the zones above and below it.

*Example II*

During the production of oil from a producing well, the water-to-oil ratio in the produced fluid begins to increase rapidly, indicating that water is coning into the bottom of the well from the water table beneath the oil in the reservoir. The reservoir temperature is 130° F., and the produced water is found to contain 0.7% salt by weight. Production is temporarily interrupted while a packer is set in the well two feet above the bottom of the hole, and 200 gallons of a benzene solution of beta-butyrolactone containing 25% by weight of the lactone is introduced into the isolated hole bottom at a pressure sufficient to cause fracturing of the formation. After a period of about 8 hours has elapsed, the packer is removed and production is resumed at a more favorable water-to-oil ratio.

*Example III*

While air-drilling a well, a low-pressure gas stratum is encountered. The permeable stratum is dry but contains gas and results in loss of circulation due to the rapid acceptance of drilling fluid. In accordance with this invention, the packers are set in the open hole above and below the permeable streak, and 50 gallons of a kerosine solution of phenyl-beta-propiolactone is forced into the intervening space at a pressure sufficient to cause it to enter the formation, but insufficient to cause fracturing. The formation temperature is 130° F., and the quantity of beta-lactone incorporated in the hydrocarbon solvent is 40% by weight. After the solution has been introduced, pressure is maintained between the packers for a period of two days. Then the packers are removed and air-drilling is resumed. No serious leakage into the treated zone is found to occur.

The amount of solution injected is not critical, but will depend on the thickness of the stratum to be treated and the depth of penetration desired. Satisfactory results can often be obtained using as little as 10 gallons of solution per foot of wellbore treated. Greater volumes should be employed where deep penetration of the plugging fluid is desired.

The embodiments of the invention in which an exclusive property or privilege is claimed are defined as follows:

1. The method of reducing the permeability of a porous subterranean formation having an internal temperature in the range of about 70° F. to 200° F. comprising injecting into said formation a solution consisting essentially of 10 to 50% by weight of beta-lactones of the formula

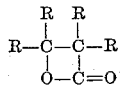

wherein each R is a radical of the group consisting of hydrogen and hydrocarbonyl radicals, in an anhydrous solvent therefor.

2. The method in accordance with claim 1 in which said formation is substantially anhydrous, the temperature of said formation is in excess of 150° F., and said solution contains about 25 to 50% by weight of beta-lactone.

3. The method in accordance with claim 2 in which said solvent is a petroleum fraction.

4. The method in accordance with claim 1 in which said formation contains substantially fresh water, said solvent is soluble in water, and the amount of beta-lactone incorporated in said solution is in the range of 10 to 30% by weight.

5. The method in accordance with claim 1 in which said formation contains water having a pH without the range of 6 to 8, and said solution comprises 10 to 30% by weight of beta-lactone in a solvent of moderate solubility in water.

6. The method in accordance with claim 1 in which said formation contains water having a salt content in excess of about 0.2% by weight and said solution comprises 10 to 30% by weight of beta-lactone in a solvent of moderate water solubility.

7. The method in accordance with claim 3 in which said lactone is beta-propiolactone.

8. The method in accordance with claim 4 in which said lactone is beta-propiolactone.

9. The method in accordance with claim 5 in which said lactone is beta-propiolactone.

10. The method in accordance with claim 6 in which said lactone is beta-propiolactone.

References Cited in the file of this patent
UNITED STATES PATENTS

| | | |
|---|---|---|
| 2,348,484 | Lawton | May 9, 1944 |
| 2,361,036 | Kung | Oct. 24, 1944 |
| 2,526,554 | Gresham et al. | Oct. 17, 1950 |
| 2,889,883 | Santora | June 9, 1959 |